United States Patent [19]
Gulick

[11] Patent Number: 5,987,560
[45] Date of Patent: Nov. 16, 1999

[54] INTEGRATED PROGRAMMABLE LOGIC CIRCUIT FOR CONDITIONING RECEIVED INPUT SIGNALS, DETECTING TRANSITIONS OF CONDITIONED SIGNALS, AND GENERATING AN ASSOCIATED INTERRUPT RESPECTIVELY

[75] Inventor: Dale E. Gulick, Austin, Tex.

[73] Assignee: Advanced Micro Devices, Inc., Sunnyvale, Calif.

[21] Appl. No.: 08/928,034

[22] Filed: Sep. 11, 1997

Related U.S. Application Data

[63] Continuation-in-part of application No. 08/802,321, Feb. 18, 1997.

[51] Int. Cl.$^6$ ............................................... G06F 13/32
[52] U.S. Cl. ........................ 710/266; 710/200; 710/48; 710/18; 365/233.5; 370/301; 375/360
[58] Field of Search ..................................... 710/267, 260, 710/200, 48, 18, 266; 712/11, 37; 340/825; 326/37; 365/233.5; 370/301; 375/36

[56] References Cited

U.S. PATENT DOCUMENTS

| | | | |
|---|---|---|---|
| 3,334,334 | 8/1967 | Halpin | 710/260 |
| 4,642,760 | 2/1987 | Yanai et al. | 710/267 |
| 4,683,530 | 7/1987 | Quatse | 710/2 |
| 4,847,612 | 7/1989 | Kaplinsky | 340/825.8 |
| 5,168,177 | 12/1992 | Shankar et al. | 326/37 |
| 5,390,191 | 2/1995 | Shiono et al. | 714/727 |
| 5,410,542 | 4/1995 | Gerbehy et al. | |
| 5,455,740 | 10/1995 | Burns . | |
| 5,557,757 | 9/1996 | Gephardt et al. | 710/126 |
| 5,678,057 | 10/1997 | Rostoker et al. | 712/11 |
| 5,696,912 | 12/1997 | Bicevskis et al. | 710/128 |
| 5,727,171 | 3/1998 | Iachetta, Jr. | 710/107 |
| 5,734,840 | 3/1998 | Chew et al. | 710/102 |
| 5,740,387 | 4/1998 | Lambrecht et al. | 710/129 |
| 5,784,637 | 7/1998 | Sawase et al. | 712/37 |

OTHER PUBLICATIONS

Fernald, Kenneth W. et al., "A System Architecture for Intelligent Implantable Biotelemetry Instruments", IEEE Engineering in Medicine & Biology Society 11$^{th}$ Annual International Conference, vol. 11, 1989, pp. 1411–1412.

Intel, "82371FB (PIIX) and 82371SB (PIIX3) PCI ISA IDE Xcelerator", May 1996, pp. 1–118.

Common Architecture, "Desktop PC/AT systems", Mar. 21, 1996, Version .93 Preliminary, pp. 1–26.

Advanced Micro Devices, "AM7968/Am7969 TAXIchip™ Article Reprints", Jan. 22, 1987, pp. 1–77, particularly pp. 67–72.

National Semiconductor, "PC87306 SuperI/O™ Enhanced Sidewinder Lite Floppy Disk Controller, Keyboard Controller, Real–Time Clock, Dual UARTs, Infrared Interface, IEEE 1284 Parallel Port, and IDE Interface", Preliminary—Nov. 1995, pp. 1–110.

*Primary Examiner*—Thomas C. Lee
*Assistant Examiner*—Tammara Peyton
*Attorney, Agent, or Firm*—Zagorin, O'Brien & Graham, LLP

[57] ABSTRACT

A flexible general input/output function utilizes a programmable logic circuit in conjunction with general purpose input/output pins. A programmable logic circuit receives the input signals from the input terminals. The programmable logic circuit program conditions the input signals and provides conditioned input signals to the remainder of the integrated circuit. An input register receives the conditioned input signals from the programmable logic circuit, and stores values representing the state of respective conditioned input signals. A transition detection circuit detects a specified transition for each of the conditioned input signals it receives and provides an indication of the specified transition. An interrupt circuit is responsive to transition indications provided from the transition detection circuit to generate an interrupt signal associated with the specified transition of a respective conditioned input signal. The integrated circuit also includes output terminals, which are coupled to the programmable logic circuit. An output register, which can be written by the system processor, provides output signals which are conditioned by the programmable logic circuit and provided to the output terminals.

24 Claims, 8 Drawing Sheets

I/O Select Register

| 7 | 6 | 5 | 4 | 3 | 2 | 1 | 0 |
|---|---|---|---|---|---|---|---|
| Out-In 7 Select | Out-In 6 Select | Out-In 5 Select | Out-In 4 Select | Out-In 3 Select | Out-In 2 Select | Out-In 1 Select | Out-In 0 Select |
| 15 | 14 | 13 | 12 | 11 | 10 | 9 | 8 |
| Reserved | Reserved | Reserved | Reserved | Reserved | Reserved | Reserved | Reserved |

FIG. 6

Output Register

| 7 | 6 | 5 | 4 | 3 | 2 | 1 | 0 |
|---|---|---|---|---|---|---|---|
| Out 7 | Out 6 | Out 5 | Out 4 | Out 3 | Out 2 | Out 1 | Out 0 |
| 15 | 14 | 13 | 12 | 11 | 10 | 9 | 8 |
| Out 15 | Out 14 | Out 13 | Out 12 | Out 11 | Out 10 | Out 9 | Out 8 |

FIG. 7

Input Current State Register

| 7 | 6 | 5 | 4 | 3 | 2 | 1 | 0 |
|---|---|---|---|---|---|---|---|
| In 7 State | In 6 State | In 5 State | In 4 State | In 3 State | In 2 State | In 1 State | In 0 State |
| 15 | 14 | 13 | 12 | 11 | 10 | 9 | 8 |
| Reserved | Reserved | 3-Level 1 Bit 1 | 3-Level 1 Bit 0 | 3-Level 0 Bit 1 | 3-Level 0 Bit 0 | Count In 1 State | Count In 0 State |

FIG. 8

Table 4-Positive Transition Enable Register

| 7 | 6 | 5 | 4 | 3 | 2 | 1 | 0 |
|---|---|---|---|---|---|---|---|
| In 7 | In 6 | In 5 | In 4 | In 3 | In 2 | In 1 | In 0 |
| 15 | 14 | 13 | 12 | 11 | 10 | 9 | 8 |
| Reserved | Reserved | Reserved | Reserved | Reserved | Reserved | Count In 1 | Count In 2 |

FIG. 9

Transition Status Register for Two Level Inputs

| 7 | 6 | 5 | 4 | 3 | 2 | 1 | 0 |
|---|---|---|---|---|---|---|---|
| In 7 | In 6 | In 5 | In 4 | In 3 | In 2 | In 1 | In 0 |
| 15 | 14 | 13 | 12 | 11 | 10 | 9 | 8 |
| Reserved | Reserved | Reserved | Reserved | Reserved | Reserved | Reserved | Reserved |

*FIG. 10A*

Transition Status Register for Count Bits

| 7 | 6 | 5 | 4 | 3 | 2 | 1 | 0 |
|---|---|---|---|---|---|---|---|
| Reserved | Reserved | Reserved | Reserved | Reserved | Reserved | Count In 1 | Count In 0 |
| 15 | 14 | 13 | 12 | 11 | 10 | 9 | 8 |
| Reserved | Reserved | Reserved | Reserved | Reserved | Reserved | Reserved | Reserved |

*FIG. 10B*

Transition Status Register for Tri-Level Bits

| 7 | 6 | 5 | 4 | 3 | 2 | 1 | 0 |
|---|---|---|---|---|---|---|---|
| Reserved | Reserved | Reserved | Reserved | Reserved | Reserved | 3-Level 1 | 3-Level 0 |
| 15 | 14 | 13 | 12 | 11 | 10 | 9 | 8 |
| Reserved | Reserved | Reserved | Reserved | Reserved | Reserved | Reserved | Reserved |

*FIG. 10C*

Interrupt Enable Register

| 7 | 6 | 5 | 4 | 3 | 2 | 1 | 0 |
|---|---|---|---|---|---|---|---|
| In 7 | In 6 | In 5 | In 4 | In 3 | In 2 | In 1 | In 0 |
| 15 | 14 | 13 | 12 | 11 | 10 | 9 | 8 |
| Reserved | Reserved | Reserved | Reserved | 3-Level 1 | 3-Level 0 | Count In 1 | Count In 0 |

*FIG. 11*

Interrupt Source Register

| 7 | 6 | 5 | 4 | 3 | 2 | 1 | 0 |
|---|---|---|---|---|---|---|---|
| In 7 | In 6 | In 5 | In 4 | In 3 | In 2 | In 1 | In 0 |
| 15 | 14 | 13 | 12 | 11 | 10 | 9 | 8 |
| Reserved | Reserved | Reserved | Reserved | 3-Level 1 | 3-Level 0 | Count In 1 | Count In 0 |

FIG. 12

Transition Count Register

| 7 | 6 | 5 | 4 | 3 | 2 | 1 | 0 |
|---|---|---|---|---|---|---|---|
| Bit 7 | Bit 6 | Bit 5 | Bit 4 | Bit 3 | Bit 2 | Bit 1 | Bit 0-LSB |
| 15 | 14 | 13 | 12 | 11 | 10 | 9 | 8 |
| Bit15-MSB | Bit 14 | Bit 13 | Bit 12 | Bit 11 | Bit 10 | Bit 9 | Bit 8 |

FIG. 13

| 7 | 6 | 5 | 4 | 3 | 2 | 1 | 0 |
|---|---|---|---|---|---|---|---|
| Wake-Up B Bit 3 | Wake-Up B Bit 2 | Wake-Up B Bit 1 | Wake-Up B Bit 0 | Wake-Up A Bit 1 | Wake-Up A Bit 2 | Wake-Up A Bit 1 | Wake-Up A Bit 0 |
| 15 | 14 | 13 | 12 | 11 | 10 | 9 | 8 |
| Wake-Up D Bit 3 | Wake-Up D Bit 2 | Wake-Up D Bit 1 | Wake-Up D Bit 0 | Wake-Up C Bit 3 | Wake-Up C Bit 2 | Wake-Up C Bit 1 | Wake-Up C Bit 0 |

FIG. 14A

| 7 | 6 | 5 | 4 | 3 | 2 | 1 | 0 |
|---|---|---|---|---|---|---|---|
| Wake-Up F Bit 3 | Wake-Up F Bit 2 | Wake-Up F Bit 1 | Wake-Up F Bit 0 | Wake-Up E Bit 3 | Wake-Up E Bit 2 | Wake-Up E Bit 1 | Wake-Up E Bit 0 |
| 15 | 14 | 13 | 12 | 11 | 10 | 9 | 8 |
| Wake-Up H Bit 3 | Wake-Up H Bit 2 | Wake-Up H Bit 1 | Wake-Up H Bit 0 | Wake-Up G Bit 3 | Wake-Up G Bit 2 | Wake-Up G Bit 1 | Wake-Up G Bit 0 |

FIG. 14B

| 7 | 6 | 5 | 4 | 3 | 2 | 1 | 0 |
|---|---|---|---|---|---|---|---|
| IOP3/ | IOP3 | IOP2/ | IOP2 | IOP1/ | IOP1 | IOP0/ | IOP0 |
| 15 | 14 | 13 | 12 | 11 | 10 | 9 | 8 |
| IOP7/ | IOP7 | IOP6/ | IOP6 | IOP5/ | IOP5 | IOP4/ | IOP4 |
| 23 | 22 | 21 | 20 | 19 | 18 | 17 | 16 |
| IO03/ | IO03 | IO02/ | IO02 | IO01/ | IO01 | IO00/ | IO00 |
| 31 | 30 | 29 | 28 | 27 | 26 | 25 | 24 |
| IO07/ | IO07 | IO06/ | IO06 | IO05/ | IO05 | IO04/ | IO04 |
| 39 | 38 | 37 | 36 | 35 | 34 | 33 | 32 |
| 03/ | 03 | 02/ | 02 | 01/ | 01 | 00/ | 00 |
| 47 | 46 | 45 | 44 | 43 | 42 | 41 | 40 |
| TI11/ | TI11 | TI10/ | TI10 | TI01/ | TI01 | TI00/ | TI00 |
| 55 | 54 | 53 | 52 | 51 | 50 | 49 | 48 |
| Reserved | Reserved | Reserved | Reserved | CI1/ | CI1 | CI0/ | CI0 |
| 63 | 62 | 61 | 60 | 59 | 58 | 57 | 56 |
| Reserved | Reserved | Reserved | Reserved | Reserved | Reserved | Reserved | Reserved |

*FIG. 15*

INTEGRATED PROGRAMMABLE LOGIC CIRCUIT FOR CONDITIONING RECEIVED INPUT SIGNALS, DETECTING TRANSITIONS OF CONDITIONED SIGNALS, AND GENERATING AN ASSOCIATED INTERRUPT RESPECTIVELY

CROSS-REFERENCE TO RELATED APPLICATIONS

This application is a continuation in part of the following co-pending application entitled "SYSTEM FOR PARTITIONING PC CHIPSET FUNCTIONS INTO LOGIC AND PORT INTEGRATED CIRCUITS", Ser. No. 08/802,321, still pending filed Feb. 18, 1997, by Dale E. Gulick and which is incorporated herein by reference. This application relates to the following applications, "PC CORE LOGIC SERIAL REGISTER ACCESS BUS", by Gulick Ser. No. 08/928,035 still pending and "SYSTEM POWER MANAGEMENT PARTITIONED ACROSS A SERIAL BUS", by Gulick, Ser. No. 08/929,153, still pending which applications were filed the same day as the present application and which are incorporated herein by reference.

BACKGROUND OF THE INVENTION

1. Field of the Invention

This invention relates to computers systems and more particularly to providing flexible general purpose input/output capability.

2. Description of the Related Art

When personal computers first became prevalent, the system board (motherboard) included a relatively large number of discrete electronic components to provide all the logic functions required by the system. In order to reduce the number of components on the motherboard, both to provide space savings and to reduce costs, more and more of the functions of the computer system previously found in various components on the motherboard are being integrated into fewer and fewer integrated circuits. Thus, for example, chip sets, such as the Intel 430 FX or "Triton" chipset, have incorporated functions to provide support for various buses, memory control and input/output (I/O) circuitry.

However, system board designs still frequently require the use of various "glue" logic to support functions which may have been unanticipated when the chipsets were developed and/or are unique to a particular computer system being implemented.

One solution provided by chips supporting input/output functions is to provide general purpose input/output ports. For example, the National Semiconductor PC87306 Super I/O chip (Super I/O is a trademark of National Semiconductor Corporation) provides sixteen bits of general purpose input/output that can be read or written by software. Although that provides some flexibility in design, such an approach can still result in the need for "glue logic" on the motherboard. There exists a need to provide a more flexible approach to general purpose input/output functions in computer systems.

SUMMARY OF THE INVENTION

Accordingly, the invention provides a flexible general input/output function by utilizing a programmable logic circuit in conjunction with general purpose input/output pins. In one embodiment of the invention an integrated circuit comprises a plurality of terminals, a first group of those terminals being input terminals. A programmable logic circuit on the integrated circuit receives the input signals from the input terminals. The programmable logic circuit conditions the input signals and provides conditioned input signals to the remainder of the integrated circuit. An input register receives the conditioned input signals from the programmable logic circuit, and stores values representing the state of respective conditioned input signals. A transition detection circuit detects a specified transition for each of the conditioned input signals it receives and provides an indication of the specified transition. An interrupt circuit is responsive to transition indications provided from the transition detection circuit to generate an interrupt signal associated with the specified transition of a respective conditioned input signal. The integrated circuit also includes output terminals, which are coupled to the programmable logic circuit. An output register, which can be written by the system processor, provides output signals which are conditioned by the programmable logic circuit and provided to the output terminals.

According to another embodiment, a method of providing general input/output capability in a computer system includes providing a plurality of input terminals which receive input signals and conditioning those input signals in a programmable logic circuit coupled to the input terminals. The programmable logic circuit provides conditioned input signals to an input register which provides the state of respective conditioned input signals. A detection circuit detects a specified transition of each of the conditioned input signals and outputs a transition signal indicative thereof for each respective conditioned input signals. An interrupt circuit which is responsive to the transition signal provides an interrupt associated with the specified transition of a respective conditioned input signal.

BRIEF DESCRIPTION OF THE DRAWINGS

The present invention may be better understood, and its numerous objects, features, and advantages made apparent to those skilled in the art by referencing the accompanying drawings, wherein the use of the same reference symbols in different drawings indicates similar or identical items.

DESCRIPTION OF THE PREFERRED EMBODIMENT(S)

Figure 1:
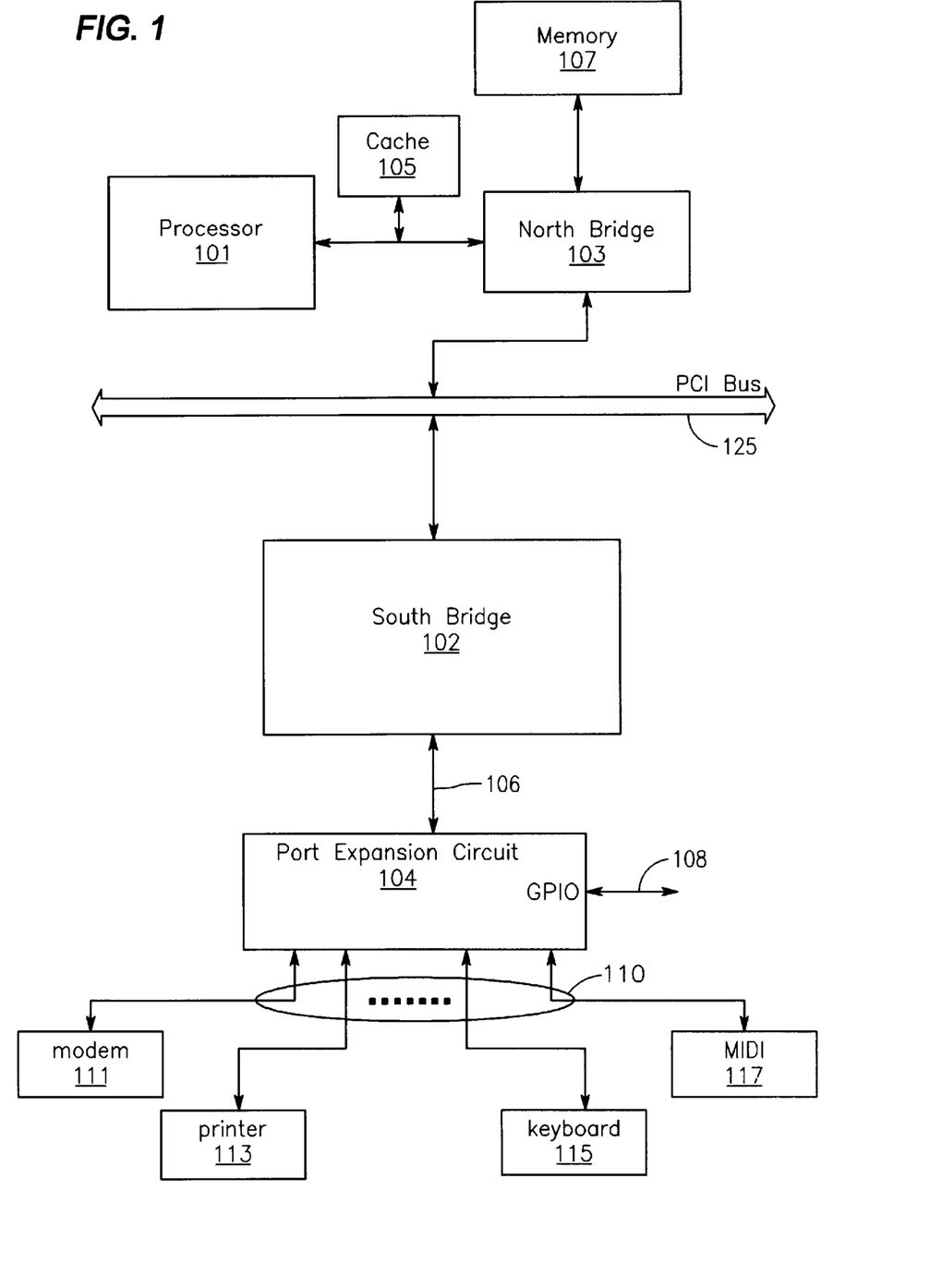
FIG. 1 is a high level block diagram of a computer system incorporating a general purpose input/output function.

FIG. 1 shows a computer system which incorporates one embodiment of the present invention. The computer system includes processor 101 which is coupled to cache memory 105 and memory 107. Bridge circuit 103 (North Bridge), provides an interface (among other functions) between processor 101 and PCI bus 125 and memory 107. Bridge circuit 102 (South Bridge) provides an interface between PCI bus 125 and a plurality of devices, buses and/or interfaces. A separate integrated circuit 104 connects to South Bridge 102 via bus 106. Integrated circuit 104, referred to herein as the port expansion circuit (PEC), is connected to South Bridge 102 via bus 106. Port expansion circuit 104 provides interfaces and/or pins to couple to a variety of devices including modem 111, printer 113, keyboard 115 and a musical instrument digital interface (MIDI) device 117. In addition port expansion circuit provides general purpose input/output (GPIO) pins 108.

Figure 2:
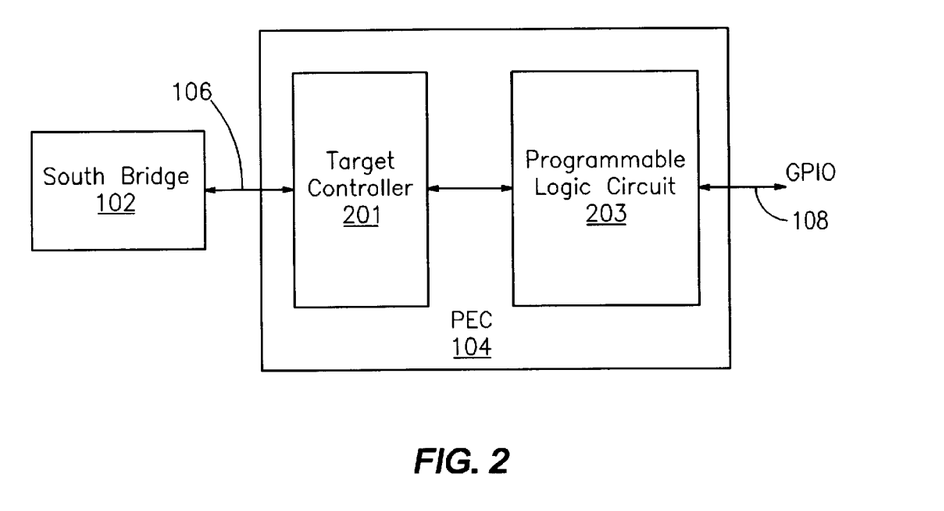
FIG. 2 is a block diagram of an integrated circuit in which general purpose input/output pins are coupled to a programmable logic circuit.

Referring to FIG. 2, general purpose input/output pins 108 are coupled to programmable logic circuit 203 in port expansion circuit 104. General purpose input/output pins 108 provide a number of general-purpose input/output pins that can be accessed and controlled via software executed on processor 101. However, unlike the prior art, the general purpose input/output pins provide greater flexibility because the pins are coupled to a programmable logic circuit. That flexibility can potentially reduce the number of components on the mother board.

One example of such a logic array is referred to as a Programmable Logic Array (PLA). A programmable logic array is an array of logic circuits in which the connections between the individual circuits, and thus the logic functions of the array, can be programmed. The programming of the PLA can take place before or after manufacture of the port expansion circuit. For example, the array can be programmed by, e.g., loading programming values into a memory resident on the port expansion circuit such as SRAM, Flash EPROM, or utilizing fuses or ROM. In the SRAM or EPROM embodiment, the array which programs the PLA can be loaded via bus 106.

Some or all of the input/output pins that are connected through the PLA can be used "locally" to perform some logic function that is not connected with the South Bridge (just like random logic on the motherboard). Alternatively, the pins, or subsets thereof, can be used in connection with the more traditional general I/O functions associated with system input/output functions.

Figure 3:
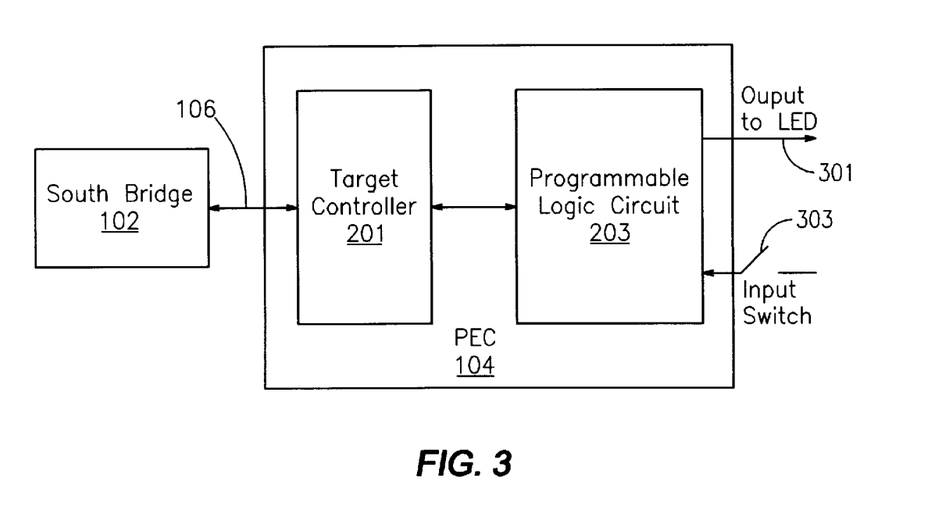
FIG. 3 shows an example of the use of programmable general purpose input/output pins.

FIG. 3 provides an exemplary use of programmable logic circuit 203. Assume that a motherboard of a personal computer has an LED that indicates whether switch 303 is open or closed, but only when the personal computer is in a particular mode of operation. That is a simple AND function. Assume also that when the personal computer is in such an operating mode, a latch (not shown) in 203 is set to a one. When the personal computer state=true (as indicated by the latch in 203) AND switch=true, then LED=ON, else LED= OFF. One signal (the switch) is an input to the programmable logic circuit via one of the port expansion circuit's general I/O pins. The other input comes from the latch in 203, which may be set by software or could also be an input to the programmable logic circuit. The result of the AND operation is output on another of the port expansion circuit's general purpose input/output pins 301 to provide the appropriate control signal to the LED.

In another embodiment, the general purpose input/output pins can be configured to provide a simple serial interface such as an $I^2C$ port, with the clock and data pins under software control.

Figure 4:
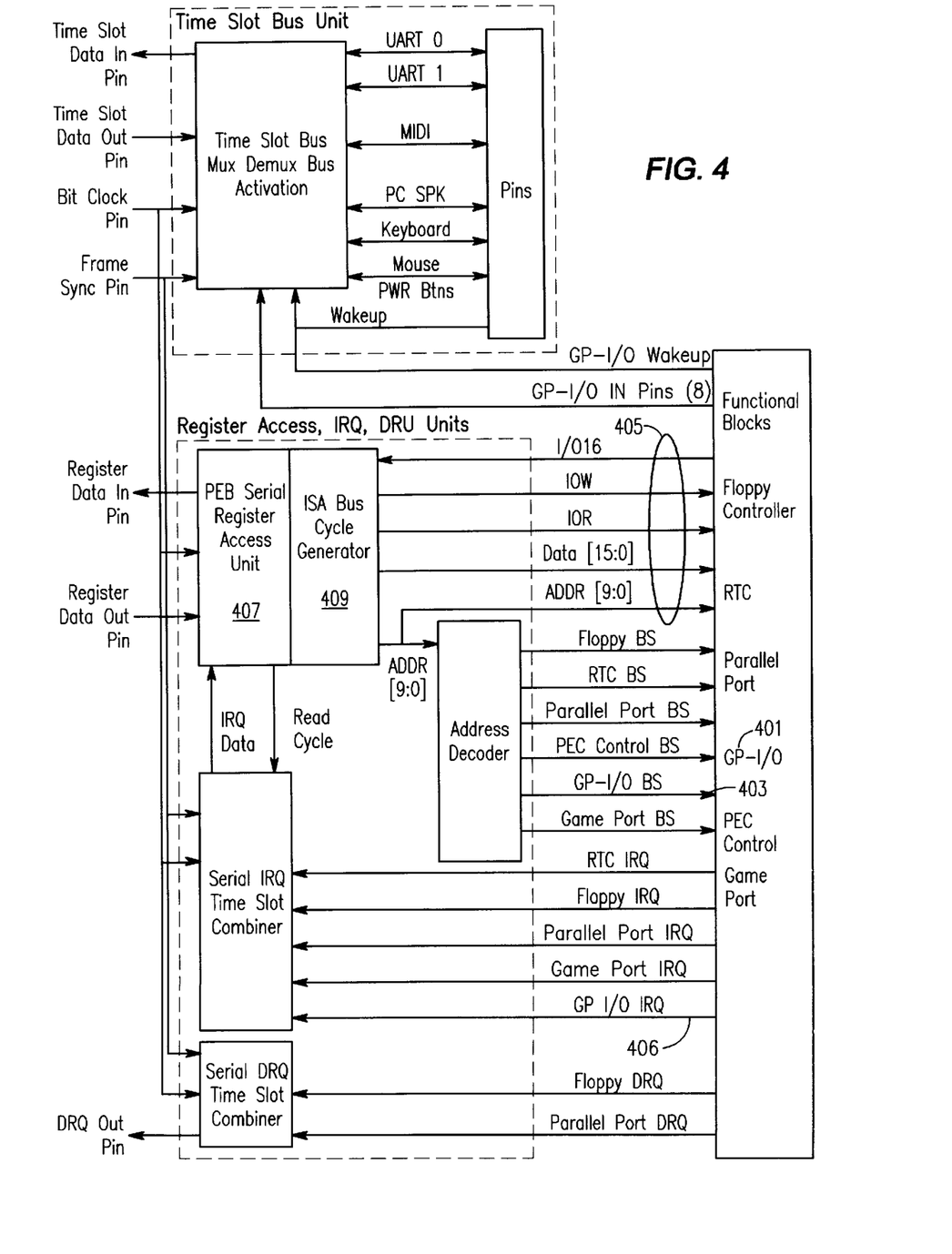
FIG. 4 shows further details of the port expansion circuit shown in FIGS. 1–3.

The port expansion circuit 104 is shown in greater detail in FIG. 4. The details of the operation and structure of the port expansion circuit and the South Bridge with which it interfaces are explained in greater detail in the application entitled "PC CORE LOGIC SERIAL REGISTER ACCESS BUS", Ser. No. 08/928,035 still pending mentioned previously. Note that the programmable logic circuit (shown as functional block GP-I/O (general purpose I/O)) is accessed, in one embodiment, over the register access portion of bus 106 coupling South Bridge and port expansion circuit 104. The serial register access unit 407 and ISA bus cycle generator 409 in port expansion circuit 104 convert data received from the register data output of the serial register access bus into data that is accessible over an ISA-like bus 405 that includes signal lines I/O 16, IOW, IOR, Data, and ADDR. In the embodiment shown, address bits 0–9 are decoded to provide block selects. Block select (BS) general purpose I/O 403 is decoded from the 10 address bits and used to select the general purpose I/O block. That allows only those address lines that are needed by a block to be provided to the block. For instance, for a block that has only 16 addressable locations, its is not necessary to provide all 10 address bits, only 4 address bits and a block select.

Figure 5:
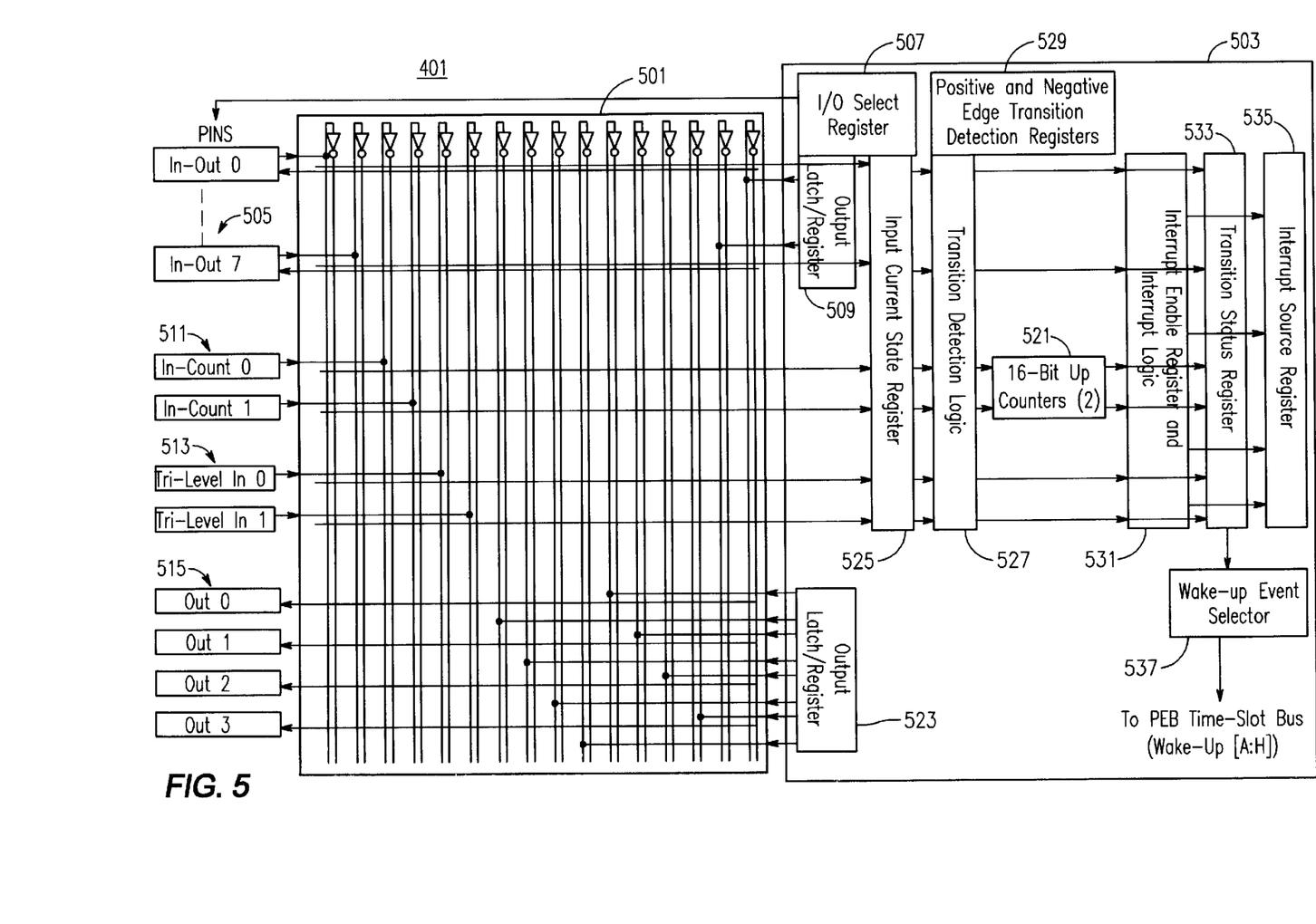
FIG. 5 shows details of the general purpose input/output block in FIG. 4.

The general purpose I/O block 401 is shown in greater detail in FIG. 5. General purpose I/O block 401 includes user programmable logic circuit 501 and various input monitoring and output driving registers and detection logic in block 503. Those registers in block 503 are accessible via bus 405. In the embodiment shown, ten monitoring and driving registers are associated with block 503, each having a common base address. All of the registers are 16 bits wide, beginning on even address boundaries. In the embodiment shown, 16 I/O pins are connected to a user programmable logic circuit 501 and are available for general I/O functions. In one embodiment, the user programmable logic circuit is a programmable logic array (PLA). The PLA shown in FIG. 5 is implemented as an AND structure PLA. Other PLA structures are known in the art, e.g., AND-OR PLAs, and could be used instead. Each output pin from the PLA and the inputs to the state and transition monitoring registers in block 503 are driven by the output of an AND structure. The input pins and output latches drive TRUE and COMPLEMENT inputs to the PLA array.

In addition to the sixteen general I/O pins, two input pins to the port expansion circuit (not shown) are provided for power and sleep switches, which support the Advanced Configuration and Power Interface (ACPI) specification. Those inputs are debounced in hardware in a manner known in the art. The values present on those pins are sent directly to the South Bridge by way of pin reflection over the port expansion bus.

Figure 6:
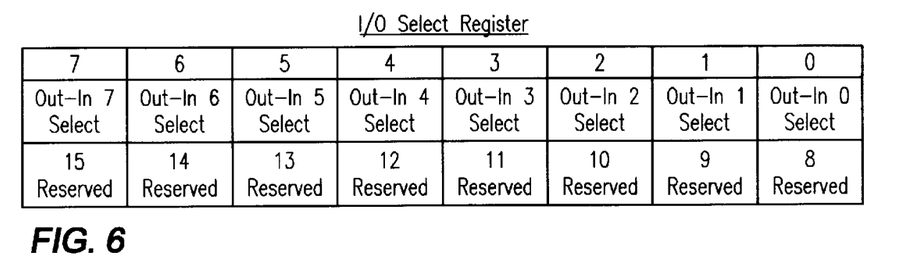
FIG. 6 shows the bit assignments for the I/O Select Register.

Eight pins 505 of the sixteen pins can be individually specified as inputs or outputs via I/O select register 507. I/O select register is a read/write register accessible via bus 405. FIG. 6 shows the bit assignments for I/O select register 507. Bits (7:0), when set, configure the corresponding pin as an output. When cleared, the corresponding pin is an input. Bits (15:8) are reserved. Reads of the reserved bits return an undefined value. Writes should preferably write zeros, except for Read-modify-writes which can write back the returned value. The default value of the defined bits is 00000000b.

When one or more of the pins 505 are selected as outputs, corresponding bits of output latch/register 509 are provided to PLA 501 to drive the selected outputs. The PLA 501 conditions those signals according to the programming of PLA 501 (and the value of the other signals relevant to the programming for the individual pin). The conditioned output signals are provided to those pins 505 which have been selected as outputs. If none of the pins 505 are selected as outputs, output latch/register 509 can still be used as inputs to the PLA for conditioning of signals.

In the embodiment shown, there are ten 2-level input pins coupled to PLA 501. Eight of the ten pins are pins 505 which are selectable as either inputs or outputs. Two pins 511 of the ten, are input only and feed transition counters 521. In the embodiment shown, counters 521 are 16-bit up counters that count the specified transitions. The counted transition can be specified as positive edge, negative edge, or both. In one embodiment, a counter input may be used to count a tachometer signal from e.g., a fan motor. The counters are readable via bus 405 and are cleared on a read operation.

Two of the inputs 513 are tri-level inputs. Each of the tri-level inputs 513 provide two terms to PLA 501 to account for the three possible states. Detection of the three states can use two detectors in a manner known in the art. Two-bits in the Input Current State register 525 identify the current state of each of these two pins. Maskable interrupts are generated on any change of state since the status register was last read.

Figure 7:
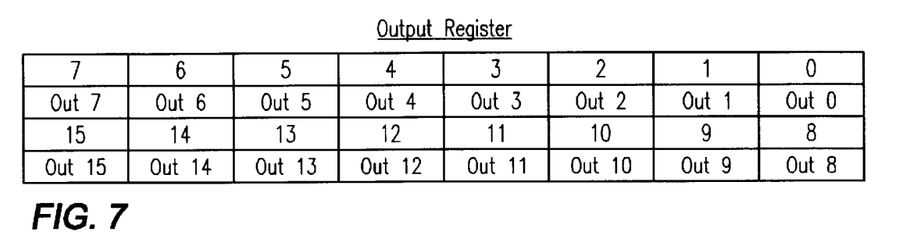
FIG. 7 shows the bit assignments for the output register.

There are 12 output pins coupled to PLA 501. Four of the output pins, 515, are dedicated as output only, and eight are selectable as inputs or outputs as discussed previously. The output latch register 523 drives the outputs for the dedicated outputs 515. Output latch 509 drives the selectable output pins 505. Note that in the embodiment shown, output register 523 supplies eight signals to PLA 501 and four of those can be used to condition the output (or other signals) rather than drive the four dedicated output pins directly. The bits comprising output latch registers 509 and 523 as shown in FIG. 7. The default value for the output register is XXXX000000000000b. Thus the twelve possible output bits default to 0.

When a bit in the output register is set, the corresponding PLA input is driven high (and its complement term is driven low). When cleared, the PLA input is driven low.

Figure 8:
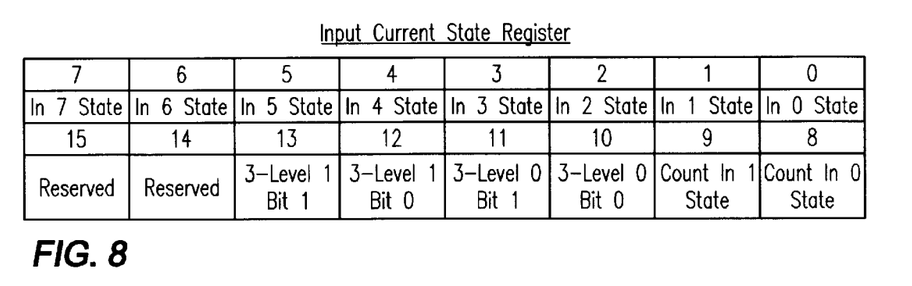
FIG. 8 shows the bit assignments for the input current state register.

The Input Current State register 525 receives input signals from the two level and tri-level inputs which have been conditioned by PLA 501 and reports the current state of the conditioned input signals. The bits of the Input Current State register 525 are shown in FIG. 8. The register is a read only register with a default value of 00XXXXXXXXXXXXXX.

Bits (15:14) in the embodiment shown are reserved and are read as zeros. Bits (13:10) indicate the state of each of the tri-level inputs. Those bit pairs report the current state of the 3-level input pins (conditioned by the PLA logic) as follows:

| Bits 1,0 | Meaning |
|---|---|
| 00 | Undefined |
| 01 | Low |
| 10 | High |
| 11 | High Z |

Thus, the two three-state inputs can be either high z, high or low. Bits (9:8) of the input current state register indicate the logic levels present on the count input pins 511 conditioned by PLA logic. Bits (7:0) of the Input Current State Register indicate the logic level present on the respective two-level input pins (conditioned by the PLA logic) at the time of the register read operation. Transition detection logic 527 detects high to low or low to high transitions on the input signals conditioned by PLA 501. A pair of transition enable registers 529, the Positive Transition Enable register and the Negative Transition Enable register, can be used to specify whether positive edges, negative edges, or both are used to update the Transition Status register. The positive transition enable register is shown in FIG. 9.

Figure 9:
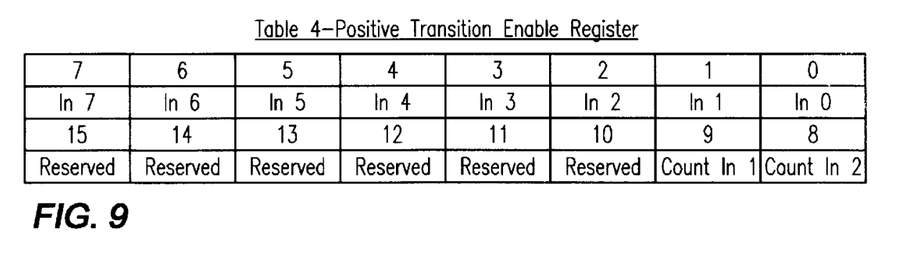
FIG. 9 shows the bit assignments for the positive transition enable register.

As shown in FIG. 9, bits (15:10) are reserved. A read operation of those bits returns an undefined value. Writes should preferably write zeros, except for Read- modify-writes which can write back the returned value. Bits (9:8) indicate the count inputs (1:0) positive transition enable. When set, a positive transition (low to high) causes the respective bit to be set in Transition Status register 533. In addition, the respective counter is incremented in response. When cleared, positive transitions are not detected. Bits (7:0) provide the positive transition enable for the 2-level inputs 505. When set, a positive transition (low to high) causes the respective bit to be set in transition status register 533. When cleared, positive transitions are not detected. That can be implemented by inhibiting saving the detection in the transition status register 533. The enable bits are supplied to transition detection logic 527 to effect detection of positive transitions in a manner known in the art.

A negative transition detection register is identical to the register shown in FIG. 9. Bits (15:10) are reserved. Reads of those bits return an undefined value. Writes preferably should write zeros, except Read-modify-writes which can write back the returned value. Bits (9:8) provide the count inputs (1:0) negative transition enable. When set, a negative transition (high to low) causes the respective bit to be set in Transition Status register 533. In addition, the respective counter is incremented in response. When cleared, negative transitions are not detected. Bits (7:0) provide the negative transition enable for the 2-level inputs 505. When set, a negative transition (high to low) causes the respective bit to be set in transition status register 533. When cleared, negative transitions are not detected which can be implemented by not saving a transition in status register 533. The enable bits are supplied to transition detection logic 527 to effect detection of negative transitions in a manner known in the art.

Figure 10A:
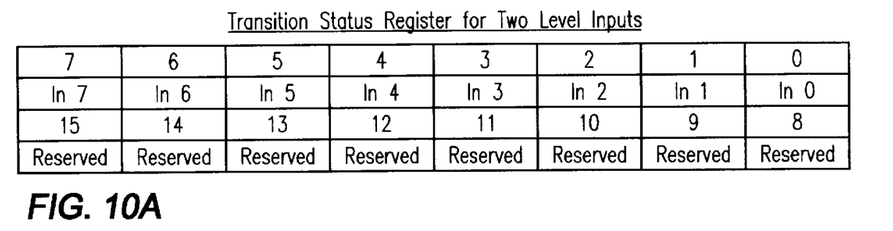
FIG. 10A shows the bit assignments for the transition status register for the regular two level inputs.

The positive and negative edge transition registers determine whether the detection is performed or whether the result of the detections are entered into the transition status register. Transition status register 533 reports the detection of transitions enabled by transition detection logic 527. In one embodiment, three separately addressable transition status registers are provided, one for regular two-level inputs, one for the counter inputs 505, and one for the three level inputs 513. A transition status register for the regular two-level inputs is shown in FIG. 10A. Bits (15:8) are reserved and return zeros on reads. Bits (7:0) provide a valid transition detected indication for the eight possible regular two-level inputs. A set bit indicates that a transition has occurred in the selected direction(s). The bits are cleared on reads.

Figure 10B:
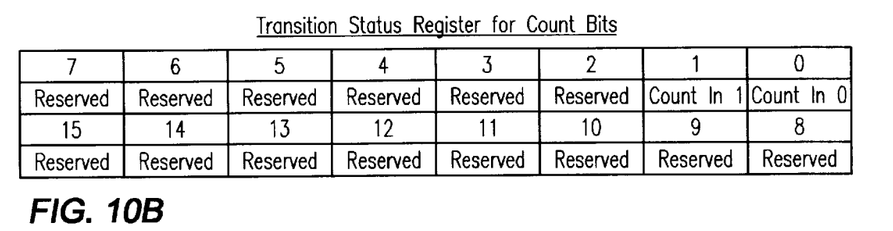
FIG. 10B shows the bit assignments for the transition status register for the count inputs.

A transition status register for the count bits reports whether a transition (in the direction specified in the Positive and Negative Transition Enable Registers 529) has occurred on the respective count input pin (conditioned by the PLA logic) since the register was last read. The transition Status Register for the count bits is shown on FIG. 10B. Bits (15:2) are reserved and read of those bits returns zeros. Bits 0 and 1, when set, indicate that a transition has occurred in the selected direction(s). When cleared, no transition has occurred. The bits are cleared on reads. The default values is all zeros.

Figure 10C:
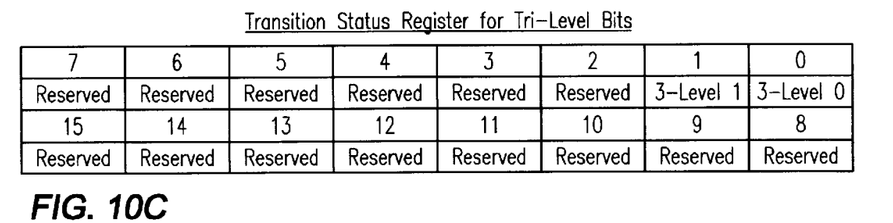
FIG. 10C shows the bit assignments for the transition status register for the three-level inputs.

The tri-level bits transition detection status register is shown in FIG. 10C. Bits (15:2) are reserved and return zeros when read. Bits (1:0) provide a valid transition detected indication. For the two 3-level inputs, any transition is detected. When cleared, no transition has occurred. The bits are cleared on reads.

Figure 11:
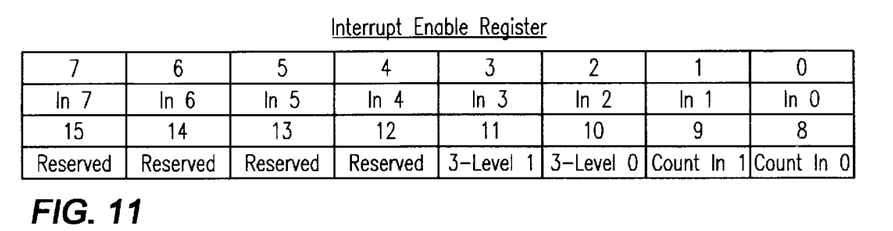
FIG. 11 shows the bit assignments for the interrupt enable register.

The input signals on the input pins supplied to the PLA can also generate interrupts. Interrupt Enable register and Interrupt logic 531 can be used to selectively enable interrupts on a bit-by-bit basis. The bits in the Interrupt Enable register 531 are logically combined (e.g., ANDed) with corresponding signals from transition detection logic 527. The bit by bit results of that logical combination can be logically ORed to form a GP-I/O interrupt request. Referring back to FIG. 4, the GPI/O interrupt request (IRQ) 406 is supplied, in the one embodiment to the South Bridge as is described in the application entitled, entitled "PC CORE LOGIC SERIAL REGISTER ACCESS BUS", Ser. No. 08/928,035 still pending mentioned previously. The contents of the interrupt enable register is shown in FIG. 11.

The interrupt enable register is a read/write register. However, bits (15:12) are reserved and a read of those bits returns an undefined value. Bits (11:0) provide the interrupt enable bits. When set, a transition at the respective input (in the direction specified in the Positive and Negative Transition Enable registers) causes an interrupt. When cleared, the interrupt is masked. The default value for the non-reserved bits of the register is all zeros.

Figure 12:
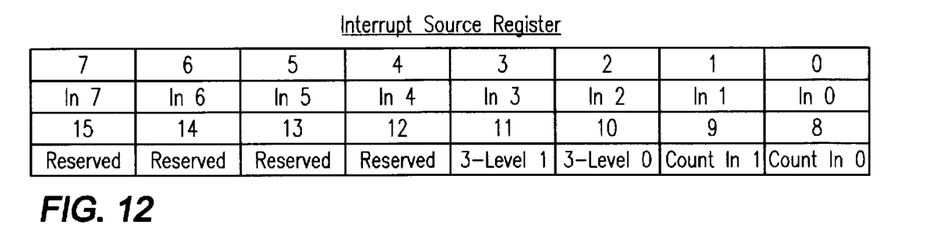
FIG. 12 shows the bit assignments for the interrupt source register.

Interrupt source register 535 indicates the type of input pin that caused the interrupt. The Interrupt Source register 535 reports the AND of the transition bits from the transition status register 533 and the enable bits. Unmasked interrupts may still operate in some embodiments when the port expansion circuit is powered down. The bits in the interrupt source register are shown in FIG. 12. The register is a read register with a default value of all zeros. Bits (15:12) are reserved and return zeros on reads. Bits (11:0) indicate the source of the interrupt as indicated. The two level inputs can be combined into bit 0 or can be separately provided in bits (7:0).

Each bit is set when the corresponding bit is set in the Transition Status register 533 and the interrupt is enabled via the Interrupt Enable register 531. In other words, the bits become set when the AND of the bits in the transition status register and corresponding interrupt enable bits becomes true. The bits are cleared when either of the two conditions for setting the bit become untrue (either a read of Transition Status register 533 or the clearing of the interrupt enable bit). Disabling the respective interrupt enable bit for an active status bit clears the status bit.

Figure 13:
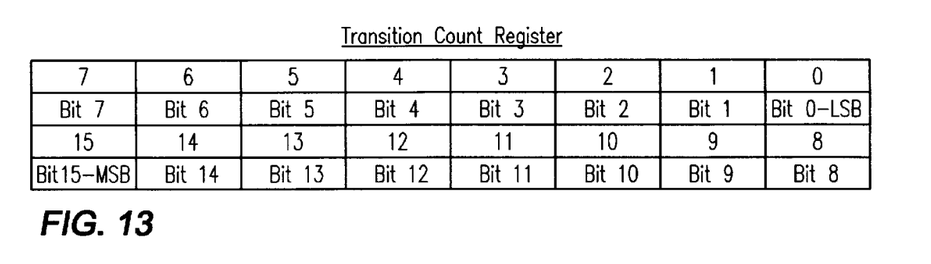
FIG. 13 shows the bit assignments for the transition count register.

A transition count register shown in FIG. 13 reports the total number of transitions in the selected direction(s) on (in the direction specified in the Positive and Negative Transition Enable registers). The register is cleared on a read. One register is provided for each of the count inputs. The registers may comprise a part of the up counters 521.

In power-management context, a number of wake-up events can be defined to transition the logic that is powered down, from one of several possible sleep states to a full power state. Because these wake-up events may occur on the port expansion chip, those must be communicated to the South Bridge. They may be communicated to South Bridge via the time slot bus portion of the port expansion bus. The details of the time slot bus are explained in greater detail in the application entitled, entitled "PC CORE LOGIC SERIAL REGISTER ACCESS BUS", Ser. No. 08/928,035 still pending mentioned previously. The wake up select register 537 selects which inputs to map to each of the wake-up time slots on the time slot bus coupling the port expansion chip and the South Bridge. Thus, a transition detected on an input, i.e., recorded in the transition status register, that has been selected in the wakeup select register, will cause the bus to wakeup.

Figure 14A:
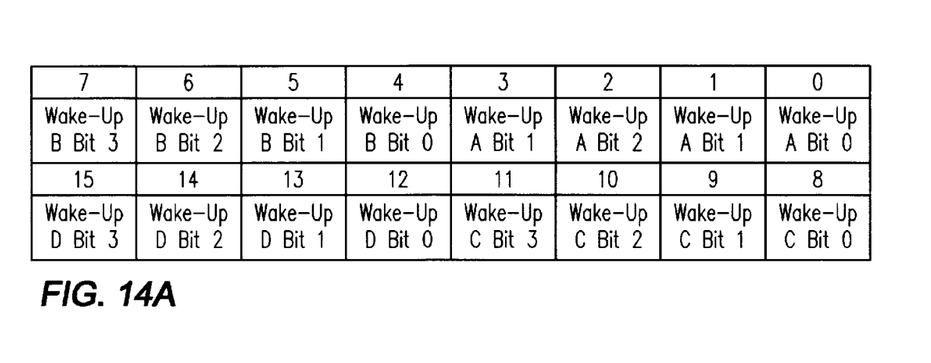
FIG. 14A shows the bit assignments for wake-up select register for time slots A–D.
Figure 14B:
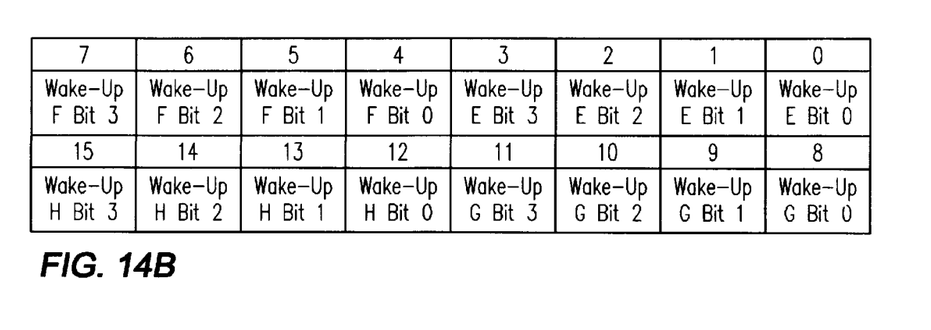
FIG. 14B shows the bit assignments for the wake-up select register for time slots E–H.

The wake up select register is shown in FIGS. 14A and 14B. FIG. 14A shows the selection for wake-up slots A–D. Bits (3:0) are used to select which of the inputs will drive the wake-up A time slot. The time slot will reflect the state of the transition status bit in transition status register associated with the selected inputs. In one embodiment, the input is selected for inclusion in the time slot bus as shown in Table 1.

TABLE 1

| BITS 3,2,1,0 | Mapping |
| --- | --- |
| 0000 | In0 |
| 0001 | In1 |
| 0010 | In2 |
| 0011 | In3 |
| 0100 | In4 |
| 0101 | In5 |
| 0110 | In6 |
| 0111 | In7 |
| 1000 | Reserved |
| 1001 | Reserved |
| 1010 | Reserved |
| 1011 | Reserved |
| 1100 | Reserved |
| 1101 | Count0 |
| 1110 | Count1 |
| 1111 | Not Used |

In a similar manner, bits (7:4) select which input will drive the wake-up B time slot. Bits (11:8) select which input will drive the wake-up C time slot. Bits (15:12) select which input will drive the wake-up D time slot. The time slots reflect the state of the transition status bit associated with the selected inputs. A second set of wake-up bits shown in FIG 14B select the inputs for wake-up time slots E–H.

Bits (3:))select which of the inputs which input will drive the wake-up E time slot. Bits (7:4) select which input will drive the wake-up F time slot. Bits (11:8) select which input will drive the wake-up G time slot. Bits (15:12) select which input will drive the wake-up H time slot. The time slots reflect the state of the transition status bit associated with the selected inputs. The inputs are selected according to Table 1.

Figure 15:
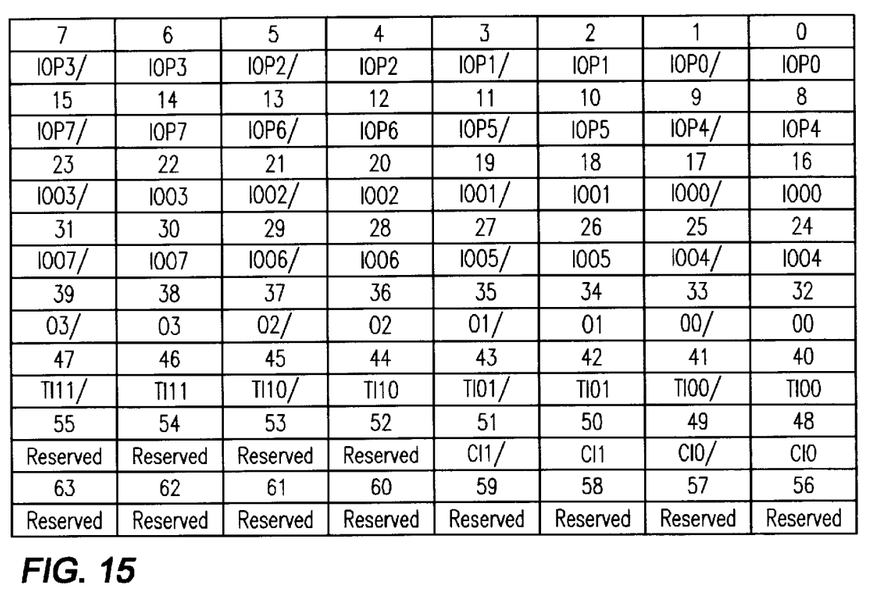
FIG. 15 shows the bit assignments for a register used to program each bit of the PLA.

In one embodiment of the invention, a bank of 30 registers, each having 64 bits is used to program the PLA. Those registers can be loaded by writing over bus 405. There is one register for each output from the PLA and one bit per register for each AND gate input (each output is driven by an AND gate with 60 inputs). Setting a bit enables the associated AND gate input in the PLA.

| Registers 0–7 | Inputs from In-Out Pins (7:0) |
|---|---|
| Registers 15–8 | Outputs from the Output Latch register associated with In-Out Pins (7:0) |
| Registers 17–16 | Inputs from In-Count Pins (1:0) |
| Registers 21–18 | Inputs from Tri-Level In Pins (1:0) (pairs) |
| Registers 29–22 | Outputs from Output Latch register |

FIG. 15 shows the 64 bits contained in each register. The bit acronyms used in FIG. 15 are: IOPx=In-Out Pin (output mode of pin); IOOx=In-Out Output (associated with input mode of pin); Ox=Output pins; Tiyx=Output associated with Tri-Level Input; y=which bit of the bit pair (See Input current State Register description); CIx=Output associated with In-Count pin. Thus, each output from the PLA can be programmed to depend on a large number of PLA input signals.

The description of the invention set forth herein is illustrative, and is not intended to limit the scope of the invention as set forth in the following claims. For instance, the number of monitoring and driving registers can vary in different embodiments. In some embodiments, the programmable logic block 401 may reside on the South Bridge, or other integrated circuit, rather than on the port expansion chip. Additionally, the number and type of input/output pins can vary in different embodiments. For instance, some embodiments may provide all input pins, all output pins or various combinations of the two. Variations and modifications of the embodiments disclosed herein, may be made based on the description set forth herein, without departing from the scope and spirit of the invention as set forth in the following claims.

What is claimed is:

1. An integrated circuit in a computer system, comprising:
    a plurality of terminals, a first group of said terminals being input terminals;
    a programmable logic circuit coupled to receive input signals from said input terminals, said programmable logic being programmable to condition said input signals and provide conditioned input signals;
    an input register coupled to receive said conditioned input signals, said input register indicating a state of respective conditioned input signals;
    a transition detection circuit coupled to receive said conditioned input signals, said transition detection circuit detecting a specified transition of each of said conditioned input signals and outputting a signal indicative thereof; and
    an interrupt circuit responsive to transitions detected in said transition detection circuit to provide an interrupt associated with said specified transition of a respective conditioned input signal.

2. The integrated circuit as recited in claim 1 further comprising:
    a second group of said terminals, said second group being output terminals coupled to said programmable logic circuit;
    an output register coupled to provide output signals to said programmable logic circuit; and wherein said programmable logic circuit conditions said output signals, said programmable logic circuit providing said conditioned output signals to said output terminals.

3. The integrated circuit as recited in claim 1 further comprising:
    a third group of terminals coupled to said programmable logic circuit;
    an input/output select circuit, including an input/output select register having programmable bits corresponding to terminals of said third group, said bits selecting said terminals of said third group as one of an input and output terminal, and wherein at least some of said first group and said third group are common.

4. The integrated circuit as recited in claim 1 further comprising:
    a counter input coupled to said programmable logic circuit as one of said input terminals, said programmable logic circuit providing a conditioned counter input signal; and wherein
    said transition detection circuit is coupled to receive said conditioned counter input signal, said transition detection circuit detecting a transition on said conditioned inputs, and outputting a transition count signal indicative thereof; and
    a counter responsive to said transition count signal for counting according to said transition count signal.

5. The integrated circuit as recited in claim 4 wherein said transition detection circuit includes:
    a programmable positive edge detection register having at least one bit controlling said transition detection circuit to detect a positive transition on said conditioned count signal; and
    a programmable negative detection register having at least one bit controlling said transition detection circuit to detect a negative transition on said condition count signal.

6. The integrated circuit as recited in claim 1 wherein said transition detection circuit comprises:
    a programmable edge detection register including bits indicating a type of transition to detect for a respective one of said conditioned inputs.

7. The integrated circuit as recited in claim 6 wherein said transition detection circuit further comprises:
    a programmable positive edge detection register having bits controlling said transition detection circuit to detect a positive transition on respective ones of said conditioned input signals; and
    a programmable negative detection register having bits controlling said transition detection circuit to detect a negative transition on respective ones of said conditioned input signals.

8. The integrated circuit as recited in claim 1 wherein said interrupt circuit includes a programmable register selectively enabling transition detection indications as interrupts.

9. The integrated circuit as recited in claim 8 further comprising:
    a transition status register storing bits indicative of a specified transition having taken place for each signal.

10. The integrated circuit as recited in claim 1 wherein said input terminals comprise at least one three level input terminal, said three level input terminal being at one of a logic high state, logic low state and a high impedance state, said three level input terminal providing two inputs to said programmable logic circuit representing said three states.

11. The integrated circuit as recited in claim 1 wherein said input terminals include a plurality of two level input terminals and a plurality of three level input terminals, said three level input terminals being at one of a logic high state, logic low state and a high impedance state, said two level input terminals being at one of a logic high state and a logic low state.

12. The integrated logic circuit as recited in claim 1 wherein said programmable logic circuit is a programmable logic array.

13. The integrated circuit as recited in claim 12 wherein said programmable logic array is structured as an AND array.

14. A method of providing general input/output capability in a computer system, comprising:
   providing a plurality of input terminals receiving input signals;
   conditioning said input signals in a programmable logic circuit coupled to said input terminals and providing conditioned input signals;
   detecting a specified transition of each of said conditioned input signals in a transition detection circuit coupled to receive said conditioned input signals and outputting a transition signal indicative thereof for each respective conditioned input signal; and
   generating interrupts in an interrupt circuit responsive to the transition signal to provide an interrupt associated with said specified transition of a respective conditioned input signal.

15. The method as recited in claim 14 further comprising:
   providing an output register coupled to provide output signals to said programmable logic circuit; and
   conditioning said output signals in said programmable logic circuit; and providing said conditioned output signals to output terminals coupled to said programmable logic circuit.

16. The method as recited in claim 14 further comprising:
   programmable selecting each of a group of terminals coupled to said programmable logic circuit as one of an input and output terminal.

17. The method as recited in claim 14 further comprising:
   receiving a count signal at one of said input terminals;
   conditioning said count signal in said programmable logic circuit and providing a conditioned count signal; and
   counting each specified transition on said conditioned count signal in a counter.

18. The method as recited in claim 17 wherein said specified transition is at least one of a positive and negative transition and wherein said method further comprises:
   selecting said specified transition by writing a programmable positive edge detection register having a bit specifying detection of a positive transition on said conditioned count signal; and
   selecting said specified transition by writing a negative detection register having a bit specifying detection of a negative transition on said condition count signal.

19. The method as recited in claim 14 further comprising selecting said specified transition as at least one of a positive and negative transition.

20. The method as recited in claim 14 further comprising selectively enabling transitions on respective conditioned input signals to cause interrupts.

21. The method as recited in claim 14 further comprising:
   p1 receiving at least one of said input terminals a three level signal, said three level signal being one of a logic high, a logic low and a high impedance; and
   providing two inputs to said programmable logic circuit for said three level signal.

22. A method of providing general input/output capability in a computer system, comprising:
   providing at least one input terminal receiving an input signal indicating a condition in the computer system;
   providing a programmable logic array coupled to said at least one input terminal;
   generating an output signal in said programmable logic array according to said at least one input signal and at least a second signal received by said programmable logic array, said second signal indicating a mode of operation of said computer system;
   providing said output signal from said programmable logic array to an output terminal coupled to said programmable logic array, thereby providing said output signal to control a component in said computer system.

23. The method as recited in claim 22 wherein said condition is position of a switch.

24. The method as recited in claim 22 wherein said component is an LED.

* * * * *